(12) United States Patent
Murata et al.

(10) Patent No.: US 9,558,151 B2
(45) Date of Patent: Jan. 31, 2017

(54) DATA PROCESSING DEVICE AND DATA PROCESSING METHOD THEREOF

(75) Inventors: Kan Murata, Kanagawa (JP); Hideyuki Noda, Kanagawa (JP); Masaru Haraguchi, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 1275 days.

(21) Appl. No.: 13/365,928

(22) Filed: Feb. 3, 2012

(65) Prior Publication Data
US 2012/0265964 A1 Oct. 18, 2012

(30) Foreign Application Priority Data
Feb. 22, 2011 (JP) .................................. 2011-035762

(51) Int. Cl.
| | |
|---|---|
| *G06F 15/78* | (2006.01) |
| *G06F 15/80* | (2006.01) |
| *G06F 12/04* | (2006.01) |
| *G06F 7/57* | (2006.01) |
| *G06F 7/483* | (2006.01) |

(52) U.S. Cl.
CPC ............ *G06F 15/7821* (2013.01); *G06F 7/57* (2013.01); *G06F 12/04* (2013.01); *G06F 15/8007* (2013.01); *G06F 7/483* (2013.01); *G06F 2207/3812* (2013.01); *Y02B 60/1207* (2013.01); *Y02B 60/1225* (2013.01)

(58) Field of Classification Search
CPC ............ G06F 9/3887; G06F 15/17375; G06F 9/30014; G06F 9/30036; G06F 15/7821; G06F 7/57; G06F 9/30112; G06F 9/3013; G06F 12/0207; G06F 12/04; G06F 15/8007; G06F 15/8061
See application file for complete search history.

(56) References Cited

U.S. PATENT DOCUMENTS 5,805,915 A * 9/1998 Wilkinson ............ G06F 9/3885
                                            712/16
6,275,838 B1 * 8/2001 Blomgren ................ G06F 1/08
                                            708/501
(Continued)

FOREIGN PATENT DOCUMENTS

| JP | 2001-027945 | 1/2001 |
|---|---|---|
| JP | 2001-167058 | 6/2001 |

OTHER PUBLICATIONS

C. R. Johns and D. A. Brokenshire; "Introduction to the Cell Broadband Engine Architecture"; IBM Journal of Research and Development; vol. 51; Issue 5; Sep. 2007.*

*Primary Examiner* — Benjamin Geib
(74) *Attorney, Agent, or Firm* — McDermott Will & Emery LLP

(57) ABSTRACT

Disclosed is a data processing device capable of efficiently performing an arithmetic process on variable-length data and an arithmetic process on fixed-length data. The data processing device includes first PEs of SIMD type, SRAMs provided respectively for the first PEs, and second PEs. The first PEs each perform an arithmetic operation on data stored in a corresponding one of the SRAMs. The second PEs each perform an arithmetic operation on data stored in corresponding ones of the SRAMs. Therefore, the SRAMs can be shared so as to efficiently perform the arithmetic process on variable-length data and the arithmetic process on fixed-length data.

7 Claims, 18 Drawing Sheets

(56) References Cited

U.S. PATENT DOCUMENTS 6,493,817 B1    12/2002  Renstrom
7,284,113 B2 *  10/2007  Prokopenko ........ G06F 9/30032
                                            345/643

* cited by examiner

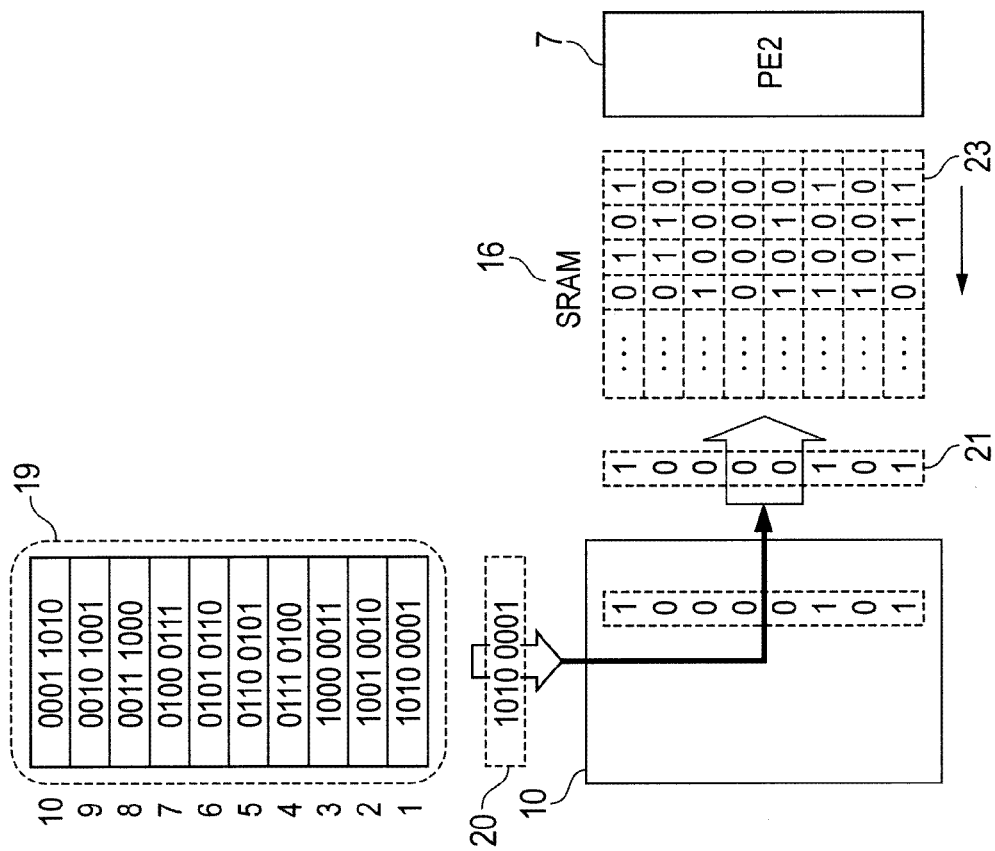
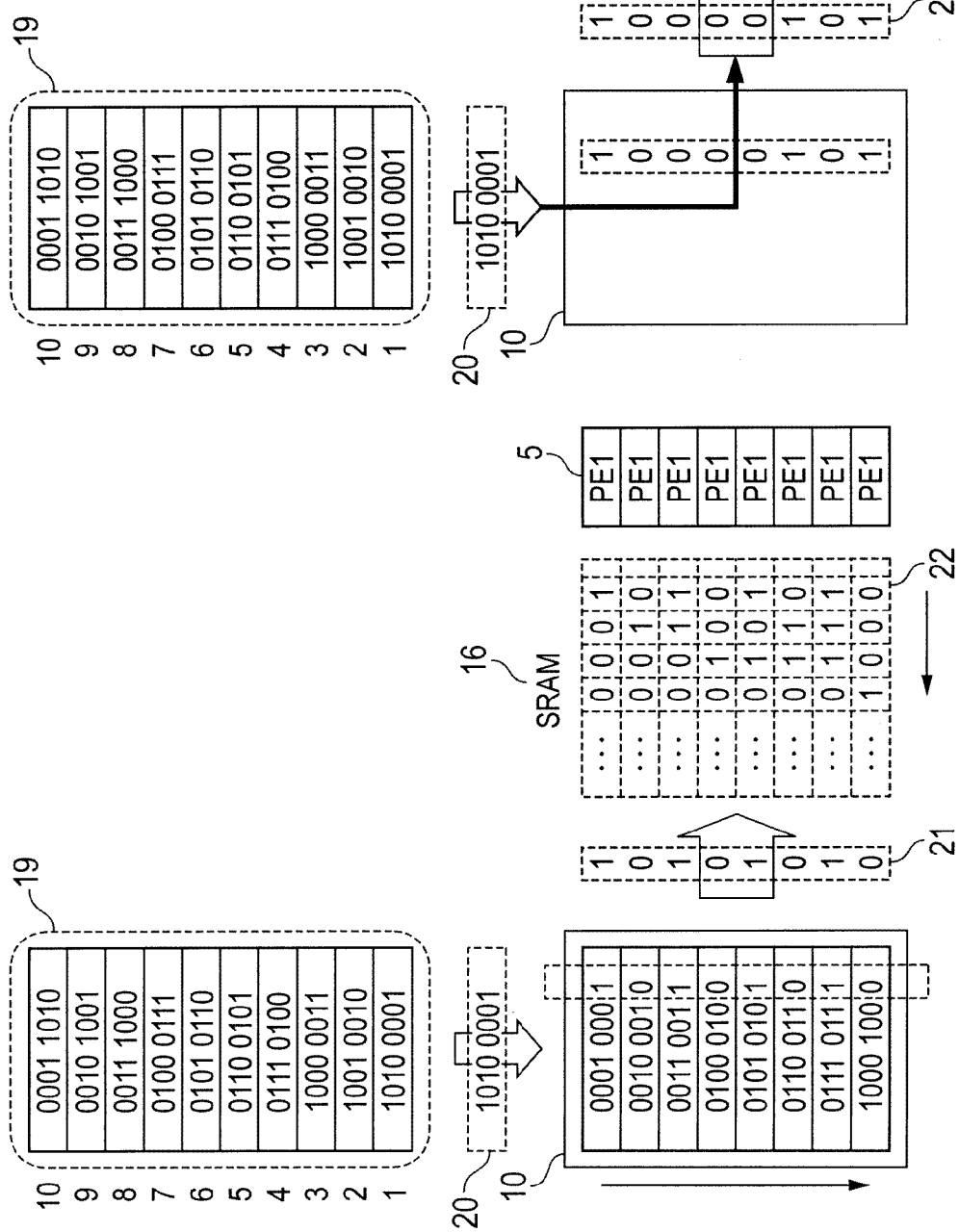
FIG. 6A
FIG. 6B

FIG. 8A vi INSTRUCTION (CONTROLLER INSTRUCTION SUBSET)

| | | | |
|---|---|---|---|
| .vi 0 | jne pe0: | mvinc mp, r0, r1 | mvinc ap, r2, r3 |
| .vi 1 | step: | ... | ... |
| ⋮ | | | |
| .vi 7 | step: | ... | ... |

FIG. 8B

EXECUTION INSTRUCTION (CONTROLLER INSTRUCTION SUBSET + FPU INSTRUCTION)

| | | |
|---|---|---|
| vi 0: | fadd ap2, ap, mp | ADD INSTRUCTION |
| vi 0: | fmul ap2, ap, mp | MULTIPLY INSTRUCTION |
| vi 0: | fmac ap, mp | PRODUCT-SUM INSTRUCTION |

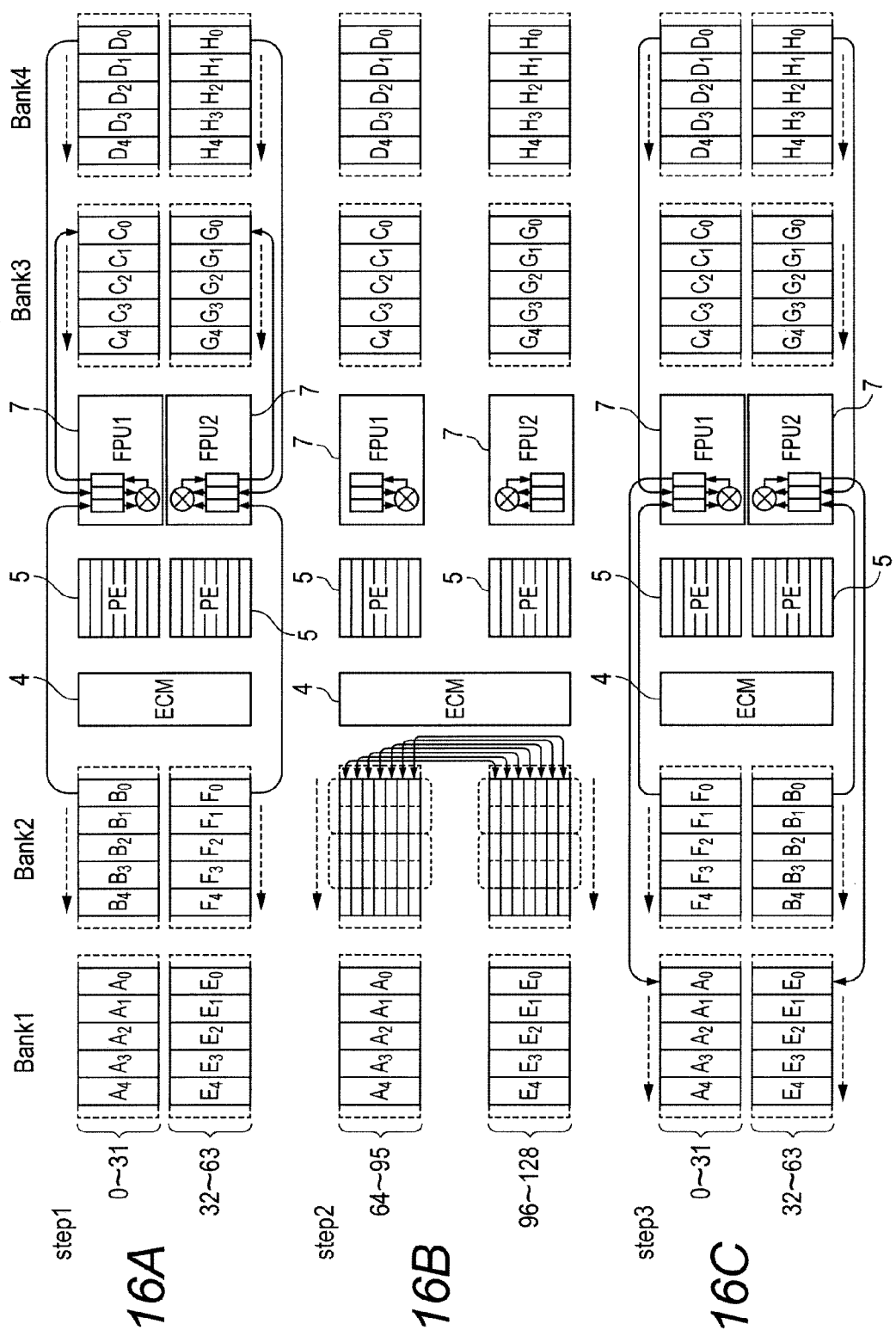

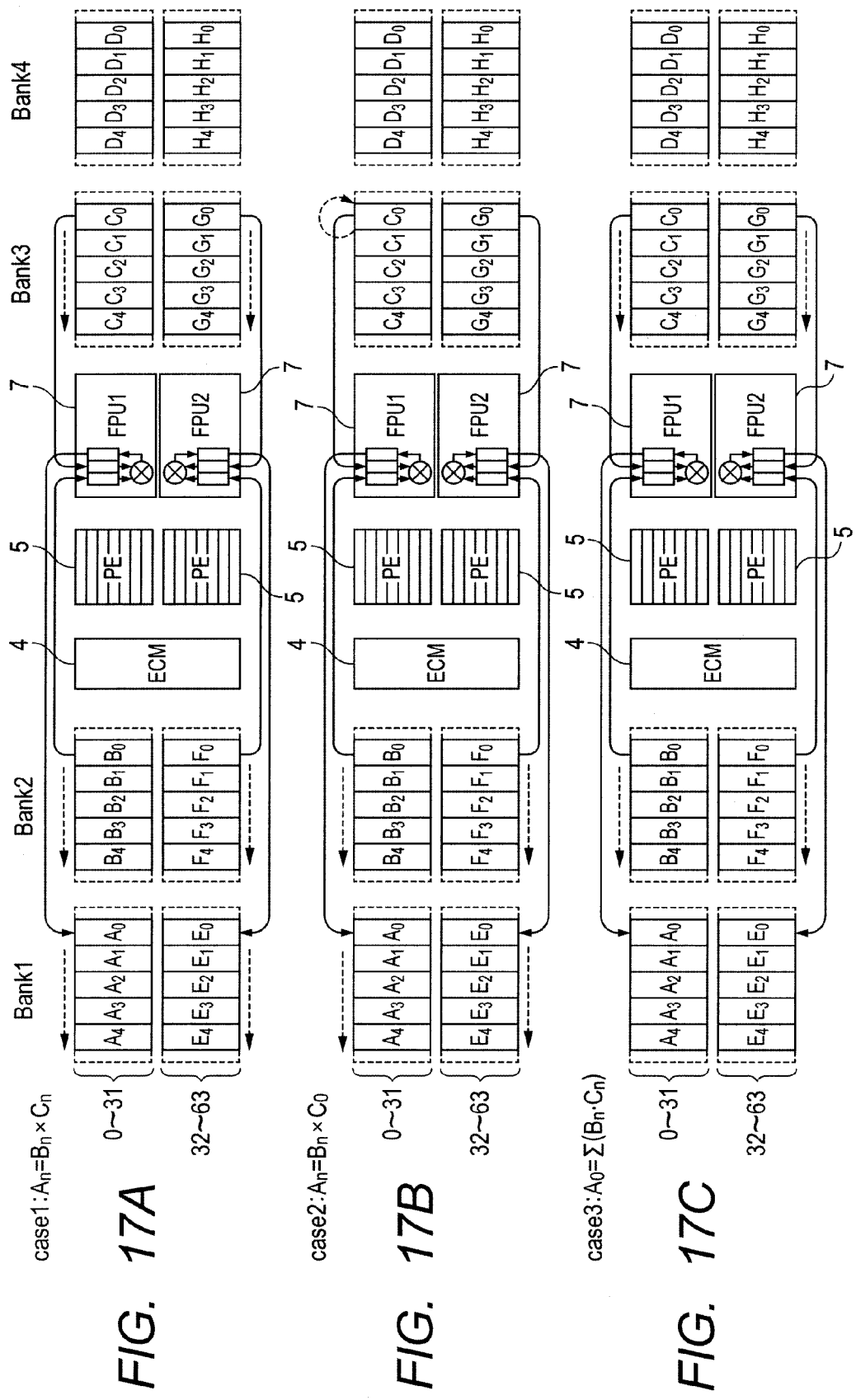

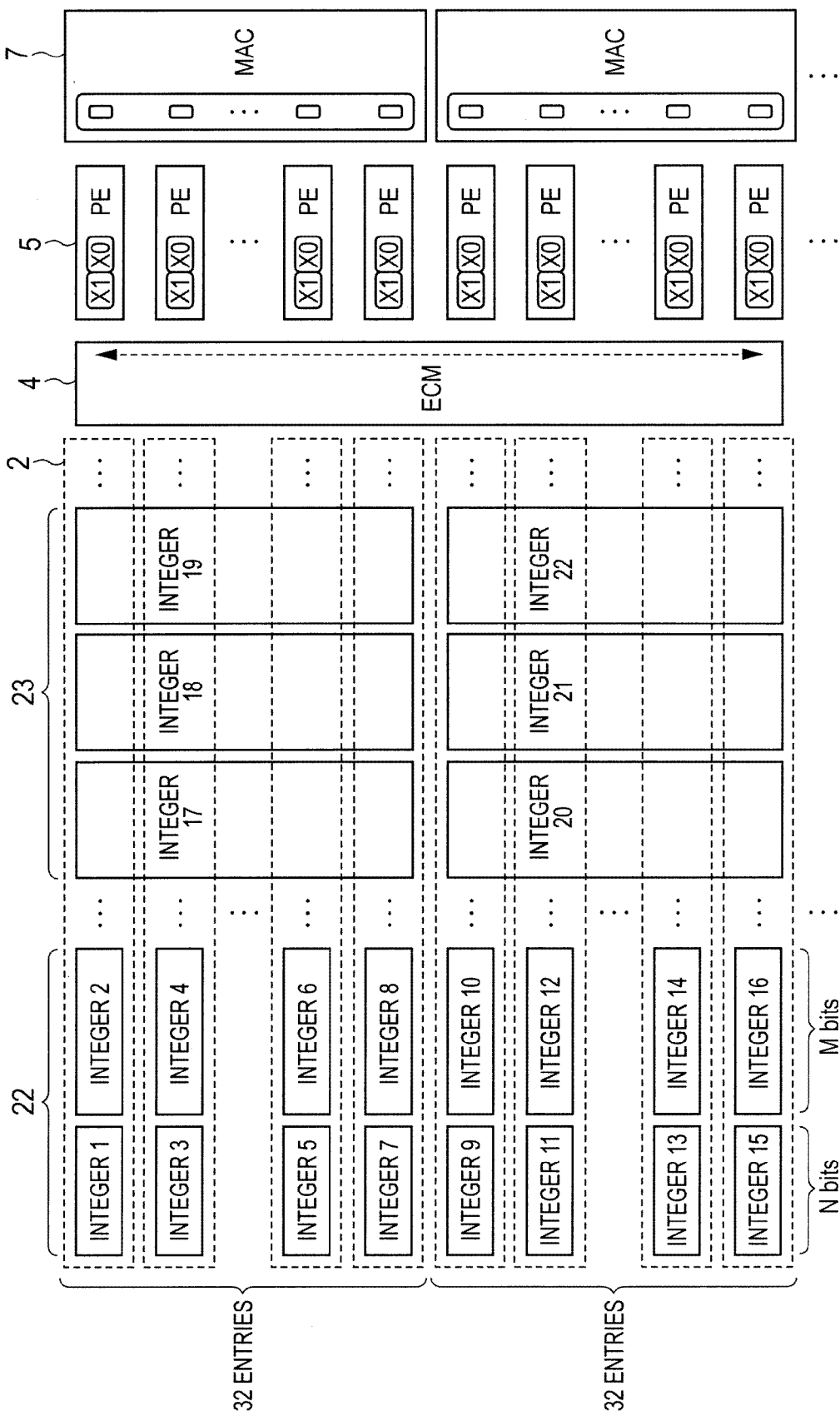

DATA PROCESSING DEVICE AND DATA PROCESSING METHOD THEREOF

CROSS-REFERENCE TO RELATED APPLICATIONS

The disclosure of Japanese Patent Application No. 2011-35762 field on Feb. 22, 2011 including the specification, drawings, and abstract is incorporated herein by reference in its entirety.

BACKGROUND

The present invention relates to a data processing device having multiple processors, and more particularly to a data processing device having a processor capable of computing variable-length bits and a processor adapted to mainly compute fixed-length bits and a data processing method thereof.

In recent years, there has been an increase in the importance of digital signal processing, which rapidly processes a large amount of audio, video, and other data. In such digital signal processing, a DSP (Digital Signal Processor) is often used as a dedicated semiconductor device under normal conditions. However, when a signal processing application, or more specifically, an image processing application, is used, the processing capacity of the DSP is not sufficient because an extremely large amount of data needs to be processed.

Meanwhile, a parallel processor technology, which enables multiple arithmetic units to operate in a parallel manner to deliver high signal processing performance, has been increasingly developed. When a dedicated processor derived from the parallel processor technology is used as an accelerator attached to a CPU (Central Processing Unit), high signal processing performance can be delivered even in a situation where low power consumption and low cost are demanded as in the case of an LSI incorporated in an embedded device.

An SIMD (Single Instruction Multiple Data stream) processor, which performs computations in accordance with an SIMD method, can be cited as an example of the above-described parallel processor.

The SIMD processor includes a fine-grained arithmetic core and is suitable for integer arithmetic operations and fixed-point arithmetic operations. Here, it is assumed that the fine-grained arithmetic core is an arithmetic core capable of computing variable-length bits by performing an arithmetic operation multiple times.

A massively parallel processor, which is an SIMD processor incorporating 1024 fine-grained arithmetic units (hereinafter may be referred to as the PEs (Processor Elements)) that are tightly coupled with a memory and capable of performing computations in units of 1 to 2 bits, can perform a large number of integer arithmetic operations and fixed-point arithmetic operations within a short period of time. The massively parallel processor may be hereinafter referred to as the matrix-type massively parallel processor (MX).

Further, as the matrix-type massively parallel processor uses the fine-grained arithmetic units, it can perform necessary bit length computations only. Therefore, its power consumption can be reduced to let it deliver higher performance-to-power consumption ratio than general-purpose DSPs and the like.

Furthermore, as the matrix-type massively parallel processor can load and execute a prepared program, it can perform parallel computations simultaneously with a CPU that controls it. Moreover, the matrix-type massively parallel processor incorporates an entry communicator (ECM) to move data between the arithmetic units as described later so that data exchange can be made simultaneously with computations with the aid of a controller supporting a VLIW (Very Long Instruction Word) instruction. Therefore, the matrix-type massively parallel processor can supply data with higher efficiency than a processor in which arithmetic units are simply arrayed in a parallel manner.

Meanwhile, a coarse-grained arithmetic core, such as a floating-point arithmetic unit (FPU), is an arithmetic unit specifically designed for fixed-length floating-point arithmetic operations and used while it is coupled to a CPU. Here, it is assumed that the coarse-grained arithmetic core is an arithmetic core capable of computing fixed-length bits by performing a single arithmetic operation.

The floating-point arithmetic unit includes a floating-point arithmetic register. The data to be subjected to an arithmetic operation is supplied from the CPU or a memory through this register. The CPU interprets an execution instruction and issues a computation request to the floating-point arithmetic unit. The floating-point arithmetic unit has a pipeline configuration. Even when a single arithmetic process is not completed in one cycle, the floating-point arithmetic unit substantially performs one arithmetic operation per cycle as far as data is continuously supplied. Relevant technologies are described in connection with inventions disclosed in Japanese Unexamined Patent Publications No. 2001-027945 and 2001-167058.

The invention disclosed in Japanese Unexamined Patent Publication No. 2001-027945 aims to provide a floating-point unit that does not require dedicated hardware for each of different data type formats. A device described in Japanese Unexamined Patent Publication No. 2001-027945 includes a floating-point unit having a standard multiply-accumulate (MAC) unit capable of performing a multiply-accumulate operation on the data type formats. The standard MAC unit is configured to compute a conventional data type format and a single-instruction multiple-data (SIMD) type format. As this eliminates the need for a dedicated SIMD MAC unit, the area of a die is considerably reduced. When an SIMD instruction is computed by one MAC unit, data is given to high-order and low-order MAC units as a 64-bit word. The MAC units each receive one and more bits selecting the upper half or the lower half of the 64-bit word. The MAC units each compute their respective 32-bit word. The results of the computations are combined into a 64-bit word by bypass blocks of the floating-point unit.

The invention disclosed in Japanese Unexamined Patent Publication No. 2001-167058 provides an information processing device capable of permitting a CPU or other similar microprocessor and an FPU (floating-point arithmetic unit) or other similar dedicated processor to perform processing operations in a parallel manner, and aims to provide an increased processing capacity by reducing the wait time of the microprocessor. The information processing device has a multi-FPU configuration. An FPU status register in an FPU coupling controller monitors the status of each of multiple FPUs. When any one of multiple CPUs issues a request concerning an assistance-requesting instruction to an FPU status decoder in the FPU coupling controller, an FPU selector is controlled so as to couple the requesting CPU to a nonoperating, unoccupied FPU in accordance with information stored in the FPU status register. Further, a temporary storage register selection controller controls a temporary storage register selector to prevent damage to data in an area used by a temporary storage register.

SUMMARY

As described above, the matrix-type massively parallel processor computes data in units of 1 to 2 bits. Therefore, the matrix-type massively parallel processor is capable of computing data of arbitrary bit length although the number of processing cycles increases in accordance with the bit length of computation target data. However, the fine-grained arithmetic units incorporated in the matrix-type massively parallel processor are designed to compute integers. Therefore, when computing floating-point data or other similar data, the fine-grained arithmetic units have to perform a "decoding" process, an "arithmetic" process, and an "encoding" process. It means that the fine-grained arithmetic units operate at a very low speed.

Further, the matrix-type massively parallel processor performs an arithmetic process by conducting, for example, 1024 parallel operations. It means that the matrix-type massively parallel processor cannot deliver its full-expected performance if a small amount of data is to be computed. In other words, the matrix-type massively parallel processor is not suitable for the processing of a filter having a small number of taps or other similar arithmetic operations in which the degree of parallelism is low and the data to be computed needs to be frequency changed.

Meanwhile, there is generally a coprocessor coupling between the floating-point arithmetic unit and a CPU so that the CPU controls the supply of instructions and data. One floating-point arithmetic unit can process only one type of arithmetic operation at a time. One arithmetic operation is processed in multiple cycles. Therefore, the floating-point arithmetic unit can deliver its expected performance when instructions are continuously supplied to a pipeline while data is continuously supplied to a register. However, it is difficult to efficiently operate the floating-point arithmetic unit because the CPU intervenes to provide control.

In recent years, low power consumption and high-speed computational performance are demanded in the field of embedded devices. Particularly, vehicle-mounted devices are beginning to employ a system that is obtained by combining an image process and a signal process for increased safety. For such a system, therefore, a mechanism capable of efficiently performing an image process and a signal process is earnestly desired.

The present invention has been made in view of the above circumstances and provides a data processing device capable of efficiently performing an arithmetic process on variable-length data and an arithmetic process on fixed-length data and a data processing method thereof.

According to an aspect of the present invention, there is provided a data processing device having multiple processors. The data processing device includes multiple SIMD PE1s, multiple SRAMs provided respectively for PE1s, and multiple PE2s. PE1s each compute data stored in a related one of the SRAMs. PE2s each compute data stored in related ones of the SRAMs.

According to an aspect of the present invention, PE1s each compute the data stored in the related one of the SRAMs, whereas PE2s each compute data stored in the related ones of the SRAMs. Therefore, the SRAMs can be shared. This makes it possible to efficiently perform an arithmetic process on variable-length data and an arithmetic process on fixed-length data.

BRIEF DESCRIPTION OF THE DRAWINGS

FIGS. 6A and 6B are diagrams illustrating an operation of an orthogonal transducer 10;

FIGS. 7A to 7D are diagrams illustrating an example of a microcode program stored in an instruction RAM 11;

FIGS. 8A and 8B are diagrams illustrating addressing control that is exercised by using a VLIW instruction;

FIGS. 16A to 16C are diagrams illustrating an example of a floating-point arithmetic operation by FPU 7;

FIGS. 17A to 17C are diagrams illustrating addressing mode examples of the data processing device according to the second embodiment of the present invention; and FIG. 18 is a diagram illustrating another example of the system according to the second embodiment of the present invention.

DETAILED DESCRIPTION

First Embodiment

Figure 1:
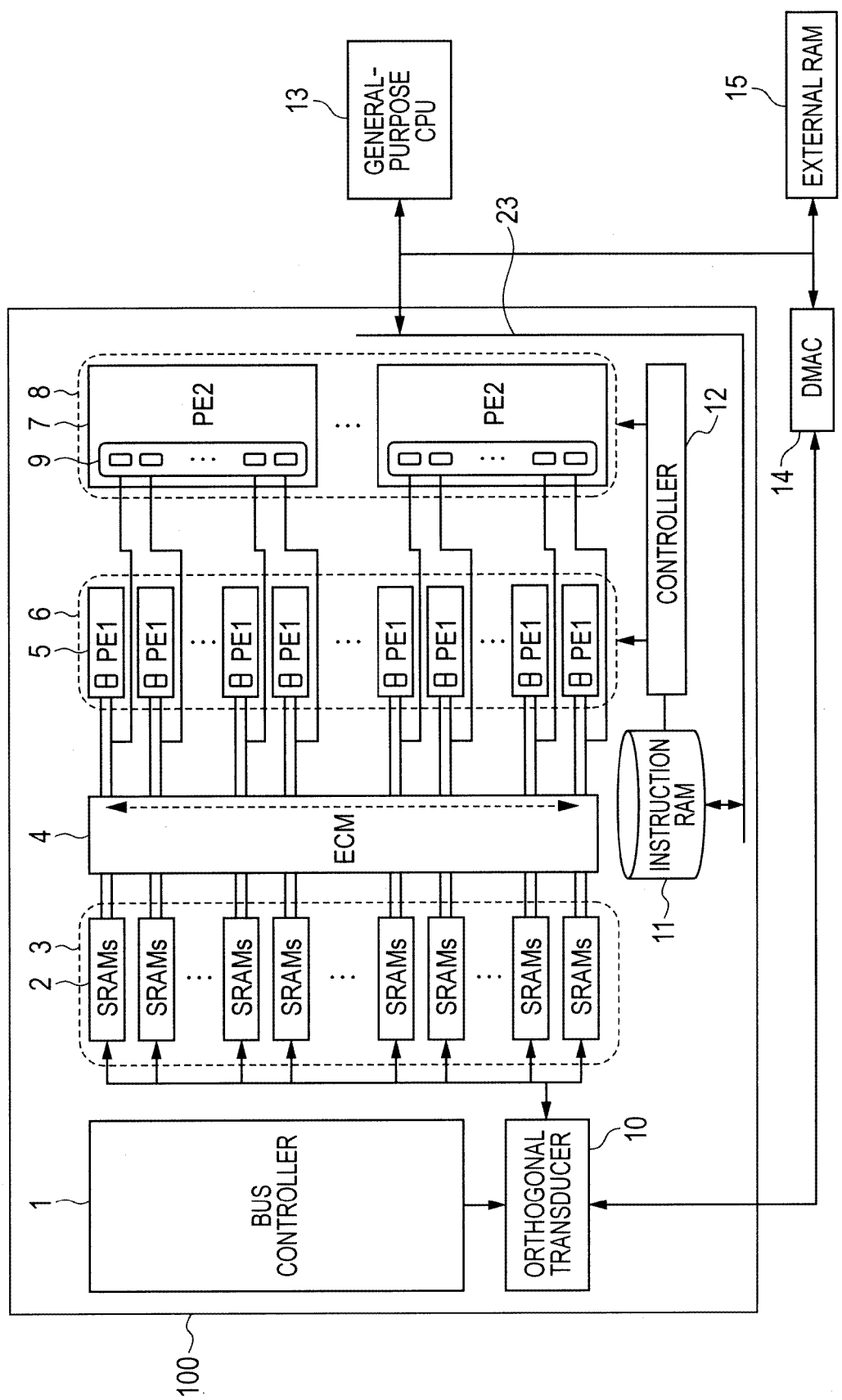
FIG. 1 is a block diagram illustrating an example configuration of a data processing device according to a first embodiment of the present invention.

FIG. 1 is a block diagram illustrating an example configuration of a data processing device according to a first embodiment of the present invention. The data processing device 100 includes a bus controller 1, a SRAM (Static Random Access Memory) array 3, an entry communicator (ECM) 4, a PE1 computation array 6, a PE2 computation array 8, an orthogonal transducer 10, an instruction RAM 11, and a controller 12. The data processing device 100 is coupled to a general-purpose CPU 13, a DMAC (Direct Memory Access Controller) 14, and an external RAM 15.

The general-purpose CPU 13 reads microcode programs stored in the external RAM 15 and transfers the microcode programs to the instruction RAM 11 through an internal bus 23 of the data processing device 100. The data processing device 100 performs an arithmetic process by executing the microcode programs stored in the instruction RAM 11. The microcode programs may be DMA-transferred by the DMAC 14.

To give computation target data to the data processing device 100, the general-purpose CPU 13 controls the DMAC 14 so that the computation target data stored in the external RAM 15 is DMA-transferred to the data processing device 100.

The bus controller 1 controls the internal bus 23 of the data processing device 100. For example, the bus controller 1 receives data that is DMA-transferred by the DMAC 14, and enters the received data into the orthogonal transducer 10. The orthogonal transducer 10 writes the entered data into the SRAM array 3 directly or after subjecting it to orthogonal transformation. Upon receipt of a request from the general-purpose CPU 13, the bus controller 1 reads data from the SRAM array 3 and outputs the data to the orthogonal transducer 10. The orthogonal transducer 10 DMA-transfers the input data to the external RAM 15 directly or after subjecting it to orthogonal transformation.

The PE1 computation array 6 has 256 units of PE1 (5), which is a 1-bit fine-grained arithmetic core. Each unit of PE1 (5) repeatedly performs an arithmetic process in units of small number of bits so that data of arbitrary bit length can be computed. The time required for processing by PE1 (5) is dependent on the bit length of processing target data. PE1 (5) is mainly suitable for initial signal processing, for example, processing performed immediately after the input of data subjected to analog-to-digital conversion, image processing, and other processing in which a large amount of short bit-length data is subjected to simple integer computation. The number of units of PE1 (5) is not limited to 256.

The PE2 computation array 8 has 8 units of PE2 (7), which is a 32-bit coarse-grained arithmetic core. Each unit of PE2 (7) can compute data of fixed bit-length. The time required for processing by PE2 (7) is not dependent on the bit length of processing target data, but is dependent only on the number of data to be computed. As PE2 (7) can compute data of fixed bit-length, it can perform special arithmetic operations like a floating-point arithmetic unit and is suitable for signal processing. Further, as PE2 (7) has a lower degree of parallelism than a fine-grained arithmetic unit, it is also suitable for the processing of a small amount of data. The number of units of PE2 (7) is not limited to 8.

The SRAM array 3 has 256 units of SRAMs 2 on a 2-bit bus. As shown in FIG. 1, 256 units of PE1 (5) and 8 units of PE2 (7) are coupled to 256 units of SRAMs 2 through the ECM 4 in such a manner that one unit of SRAMs 2 corresponds to one unit of PE1 (5). As described later, the employed configuration is such that all units of PE1 (5) can simultaneously read or write 1-bit or 2-bit data on an individual cycle basis. The number of units of SRAMs 2 is not limited to 256.

Further, 32 units of SRAMs 2 are coupled to one unit of PE2 (7) so that 32-bit data is separated into bits. The 32 bits are then respectively stored in the 32 units of SRAMs 2. As a result, PE2 (7) can read and write 32-bit data on an individual cycle basis.

The controller 12 sequentially reads and interprets the microcode programs stored in the instruction RAM 11, and controls the SRAM array 3, the ECM 4, the PE1 computation array 6, and PE2 computation array 8 to perform an arithmetic process.

Figure 2:
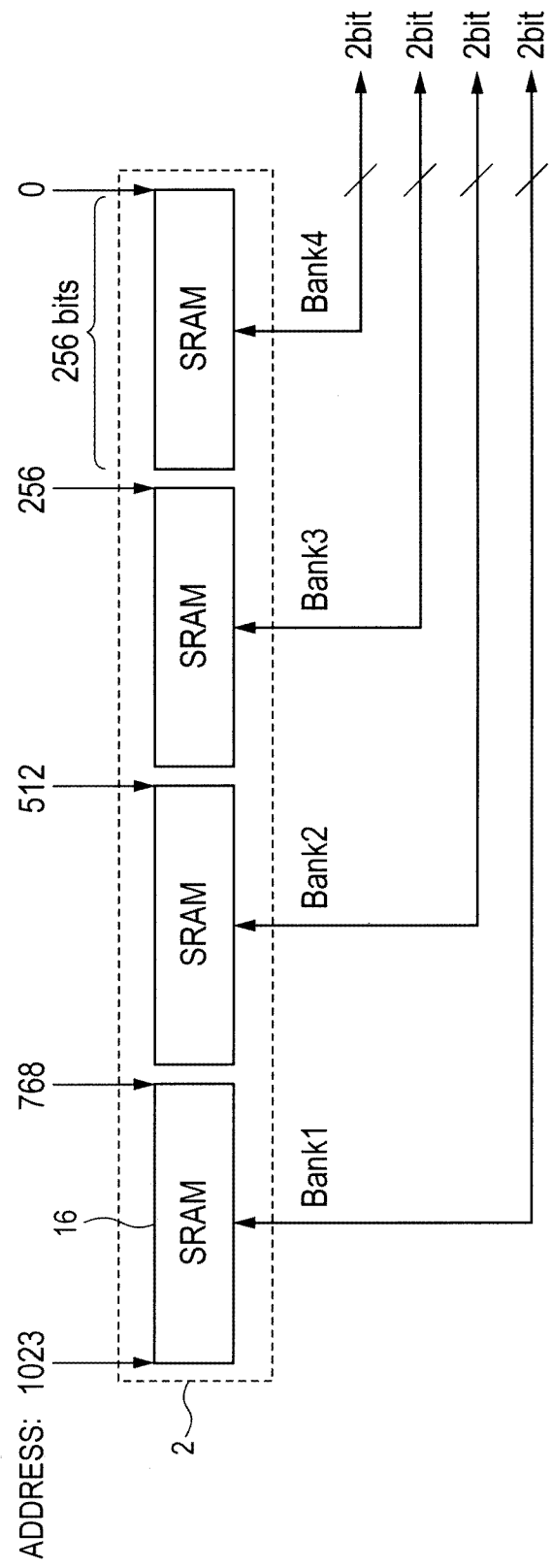
FIG. 2 is a diagram illustrating in further detail the internal configuration of SRAMs 2.

FIG. 2 is a diagram illustrating in further detail the internal configuration of the SRAMs 2. Each unit of SRAMs 2 includes 4 256-bit SRAMs 16. These SRAMs 16 are disposed at consecutive addresses. A target address can be designated to read 1-bit data in an arbitrary position of each of the SRAMs 16 or 2-bit data stored consecutively in an even-numbered bit position. These four SRAMs 16 permit simultaneous data read/data write operations and are referred to as banks 1 to 4, respectively.

Figure 3:
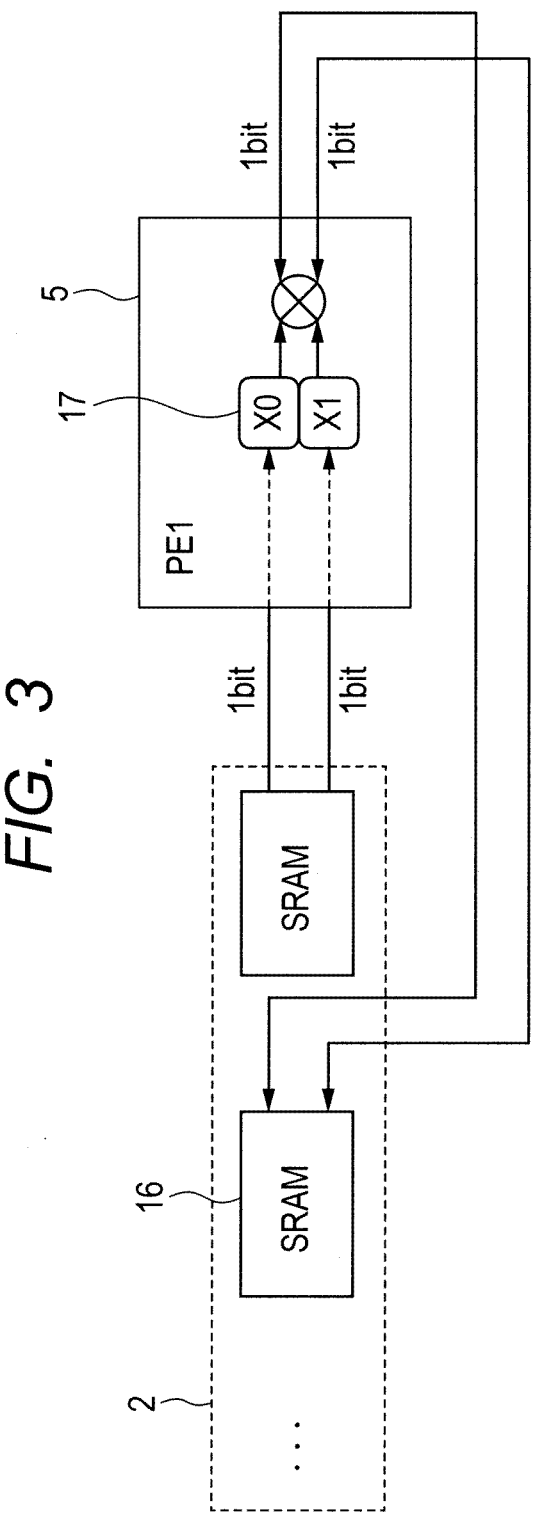
FIG. 3 is a diagram illustrating in further detail the internal configuration of PE1 (5)

FIG. 3 is a diagram illustrating in further detail the internal configuration of PE1 (5). PE1 (5) can simultaneously perform a 2-bit data read from a certain SRAM 16 (e.g., bank 4) in the SRAMs 2 and perform a 2-bit data read/write operation relative to another SRAM 16 (e.g., bank 3). Further, PE1 (5) can read or write consecutive 2-bit data stored at beginning with an even-numbered bit position in a SRAM 16 or 1-bit data at an arbitrary position in the SRAM 16.

PE1 (5) includes an arithmetic register (X0, X1) 17 and stores 2-bit data read from bank 4 in this arithmetic register 17. Simultaneously, PE1 (5) reads 2-bit data from bank 3, performs an arithmetic operation on the read 2-bit data and a value stored in the arithmetic register 17, and overwrites the result of the arithmetic operation at the same address in bank 3.

PE1 (5) also includes a 2-bit adder and a booth decoder. Therefore, PE1 (5) can subject 1-bit or 2-bit data to addition, subtraction, and multiplication and perform a logical operation on a bit-by-bit basis. The adder stores carry information in an internal register. Therefore, the adder can compute data of arbitrary bit length by repeatedly computing 1-bit or 2-bit data although it requires multiple cycles.

Figure 4:
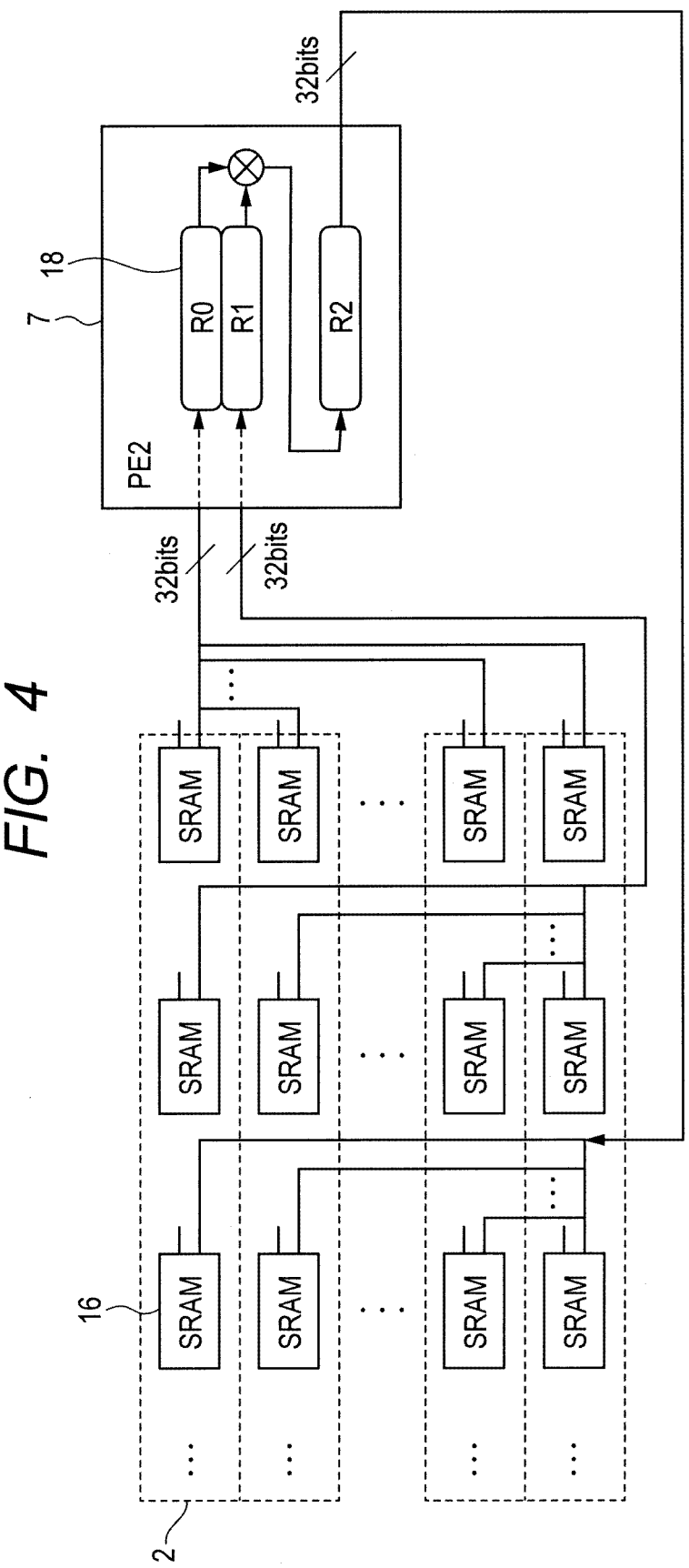
FIG. 4 is a diagram illustrating in further detail the internal configuration of PE2 (7)

FIG. 4 is a diagram illustrating in further detail the internal configuration of PE2 (7). PE2 (7) can simultaneously read two sets of 32-bit data (e.g., banks 3 and 4) and write 32-bit data (e.g., bank 2). When performing a read/write operation, PE2 (7) handles one low-order bit of each of 32 SRAMs 16 as 32-bit data.

PE2 (7) includes two 32-bit arithmetic registers (R0, R1) 18 and stores two sets of read 32-bit data in these arithmetic registers 18. Further, as PE2 (7) is an arithmetic unit configured to include a pipeline, it outputs the result of computation of previously read two sets of data to another internal register (R2) after multiple cycles. Subsequently, PE2 (7) writes a computation result stored in the internal register (R2) into 32 SRAMs 16 in another bank. In this manner, instructions can be consecutively executed as requested by the controller 12 without stopping the pipeline.

Figure 5A:
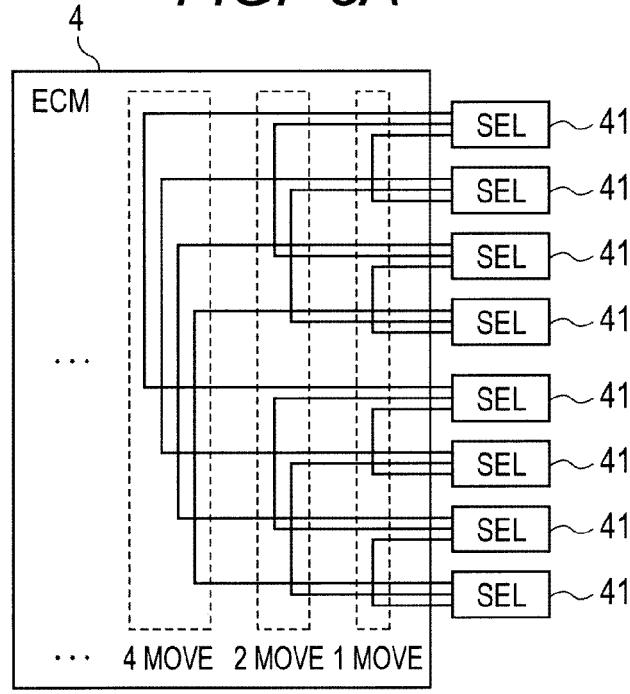
FIGS. 5A to 5C are diagrams illustrating the internal configuration and operation of an ECM 4.
Figure 5B:
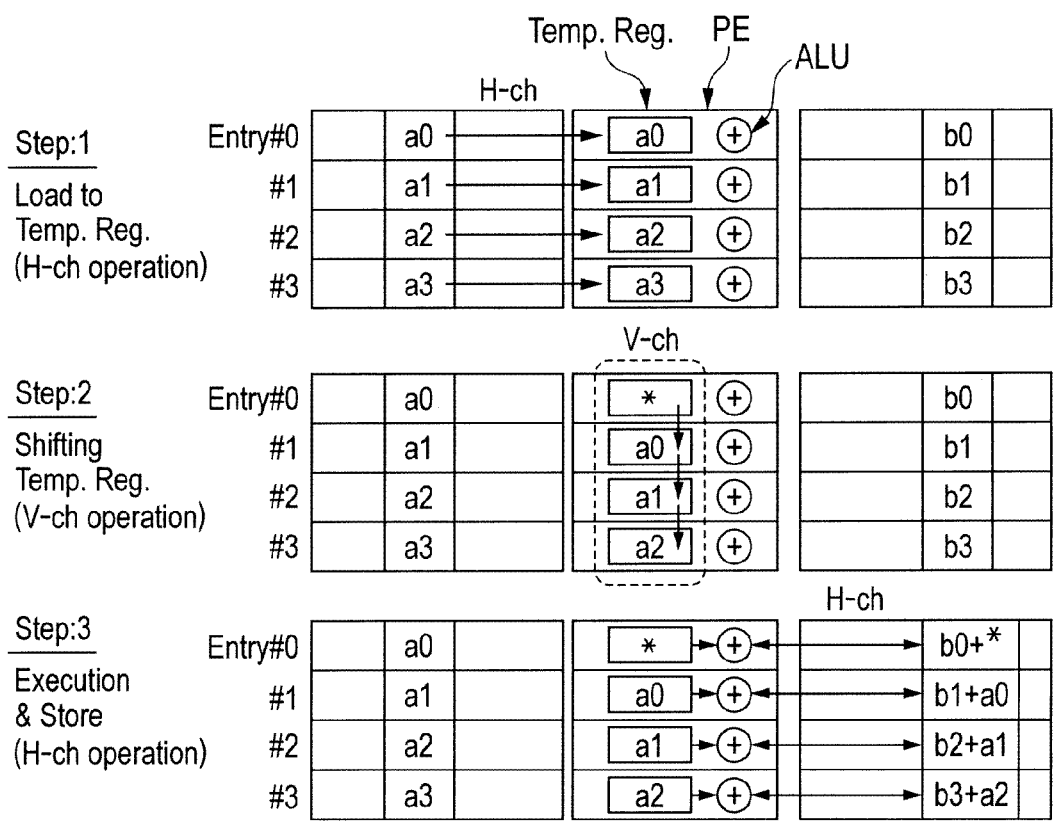
Figure 5C:
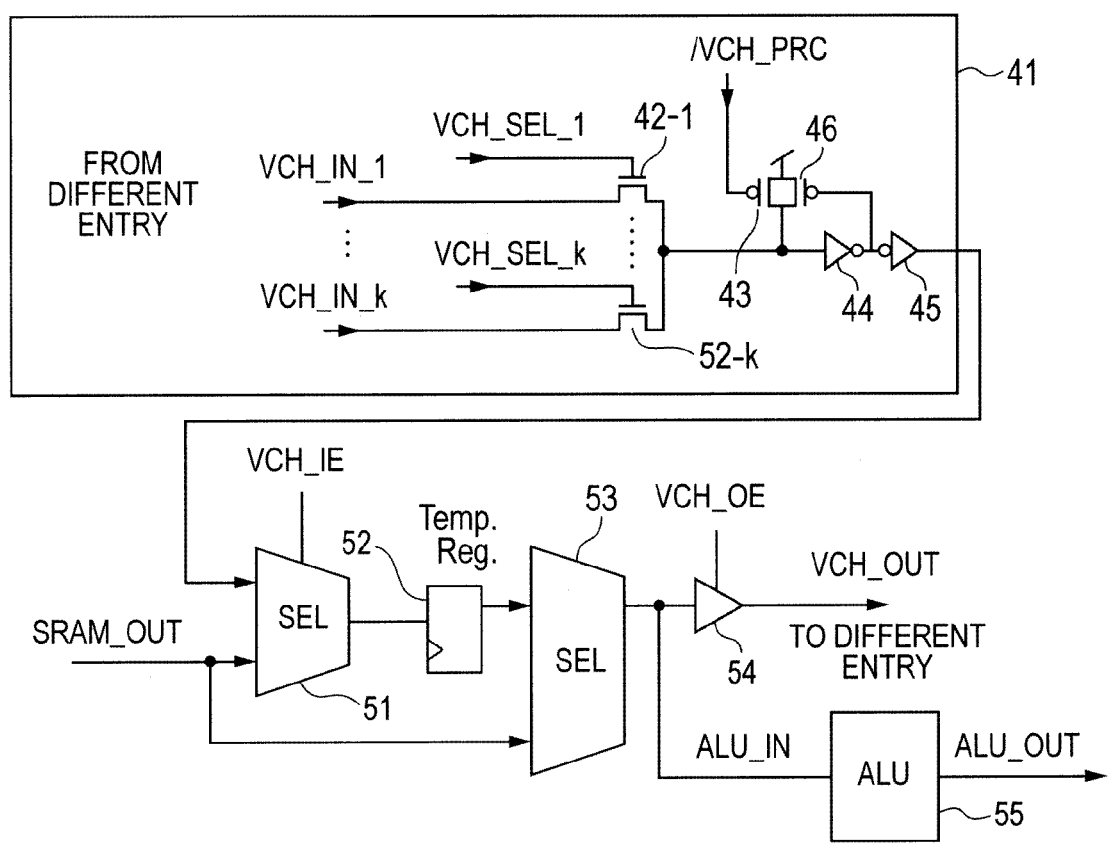

FIGS. 5A to 5C are diagrams illustrating the internal configuration and operation of the ECM 4. FIG. 5A shows how the ECM 4 is internally coupled. The ECM 4 is coupled to arithmetic cores that are positioned at distances raised to the power of two (1, 2, 4, 8, 16, 32, 64, 128). Data can be moved and exchanged in one cycle between the coupled arithmetic cores. FIG. 5A shows a case where each selector (SEL) 41 is coupled to arithmetic cores positioned at distances 1, 2, and 4.

When data is to be moved to an arithmetic core that is not positioned at a distance raised to the power of two, it can be accomplished by repeatedly moving the data to an arithmetic unit positioned at a distance raised to the power of two in such a manner as to perform an operation similar to that of a shift register. When, for instance, 6-entry data is to be moved, it is accomplished in two cycles by sequentially moving 4-entry data and 2-entry data.

Further, when PE2 (7) performs an arithmetic operation, data can be moved between the arithmetic cores by moving the data in units of 32 entries multiplied by N.

The data read from the SRAMs 2 is broadcast into a specified ECM 4. The controller 12 then specifies the distance from which data is to be read by all selectors 41. Thus, only the selected data enters PE1 (5). Therefore, the data of all entries move the same distance.

When PE1 (5), which is a 2-bit arithmetic core, performs an arithmetic operation, computation target data can be exchanged by moving data with the ECM 4. When PE2 (7) performs an arithmetic operation, data can be bit-shifted by moving the data over a distance shorter than 32 because computation target data is stored in 32 units of SRAMs 2. Conversely, the computation target data can be exchanged by moving the data over a distance not shorter than 32.

FIG. 5B is a diagram illustrating an example of an arithmetic process performed by using the ECM 4. First of all, in step 1, data a0 to a3, which are to be stored at entries #0 to #3 of a SRAM 16, are loaded into a temporary register (Temp. Reg.).

In step 2, the ECM 4 operates so that data a0 to a3, which are stored in the temporary register, are each shifted one bit. In step 3, data b0 to b3, which are stored in the SRAM 16, are read and computed together with the data stored in the temporary register so that the result of computation is overwritten at addresses at which data b0 to b3 of the SRAM 16 are stored.

FIG. 5C is a diagram illustrating in further detail the internal configuration of each selector 41 shown in FIG. 5A. The selector 41 includes N-channel MOS transistors 42-1 to 42-*k*, P-channel MOS transistors 43, 46, and inverters 44, 45.

The output of an entry positioned at a distance raised to the power of two is coupled to VCH_IN_1 to VCH_IN_*k*. One of VCH_SEL_1 to VCH_SEL_*k* is set at a high level (hereinafter abbreviated to the H level) so as to select the output of an entry coupled to the associated N-channel MOS transistor.

The output of an entry selected by the selector 41 is coupled to one terminal of a selector (SEL) 51. The output of the SRAMs 2 corresponding to the associated PE1 (5) is coupled to the other terminal. In accordance with a VCH_IE signal, the selector (SEL) 51 selects and outputs either the output of an entry selected by the selector 41 or the output of the SRAMs 2 corresponding to the PE1 (5).

A temporary register 52 temporarily stores the output from the selector (SEL) 51 and outputs it to a selector (SEL) 53. The selector (SEL) 53 selects and outputs either a value stored in the temporary register 52 or the output of the SRAMs 2 corresponding to the PE1 (5).

When data is to be transferred to a different entry, a VCH_OE signal is set at the H level so that a buffer 54 receives the output from the selector (SEL) 53 and outputs it to the different entry. Further, when a computation is performed on a value output from the selector (SEL) 53 is, an ALU 55 outputs the result of such computation (ALU_OUT).

When, for instance, data a0 to a3 are loaded into the temporary register as indicated in step 1 of FIG. 5B, the selector (SEL) 51 selects the output of the SRAMs 2 (SRAM_OUT) and outputs it to the temporary register 52. The temporary register 52 receives it and stores its value.

When a value stored in the temporary register is to be shifted as indicated in step 2 of FIG. 5B, the selector 53 selects and outputs the value stored in the temporary register 52. The buffer 54 receives the value output from the selector 53 and outputs it to VCH_OUT. In this instance, the selector 41 is set so as to select the output from a neighboring entry so that the selector 51 selects the data of a neighboring entry and outputs it to the temporary register 52. The temporary register 52 receives the output data and stores its value to complete a shift operation indicated in step 2 of FIG. 5B.

When PE1 (5) performs an arithmetic operation as indicated in step 3 of FIG. 5B, the arithmetic unit (ALU) 55 receives the value stored in the temporary register 52 through the selector (SEL) 53 and performs the arithmetic operation.

FIGS. 6A and 6B are diagrams illustrating an operation of the orthogonal transducer 10. The orthogonal transducer 10 has two data input/output ports. The orthogonal transducer 10 receives data stored in the external RAM 15 through one port 20, subjects the received data to orthogonal transformation, and stores the resultant data in the SRAM 16 through the other port 21, or stores the received data in the SRAM 16 through the other port 21 without subjecting it to orthogonal transformation.

Conversely, the orthogonal transducer 10 can receive data stored in the SRAM 16 through the port 21, subject it to orthogonal transformation, and transfers the resultant data to the external RAM 15 through the port 20 or transfer the same data to the external RAM 15 through the port 20 without subjecting it to orthogonal transformation.

Further, the orthogonal transducer 10 can receive data stored in the SRAM 16 through the port 21, subject it to orthogonal transformation, and transfer the resultant data to the SRAM 16 through the port 21.

FIG. 6A shows an operation that is performed by the orthogonal transducer 10 when data for PE1 (5) is to be stored in the SRAM 16. FIG. 6A shows a case where eight sets of 8-bit data stored in the external RAM 15 are to be transferred for use in PE1 (5). Alternatively, however, 32 sets of 32-bit data may be received, subjected to orthogonal transformation, and transferred to the SRAM 16.

As described above, the data for use in PE1 (5) needs to be stored in a corresponding SRAM 16 as a bit stream. Hence, the orthogonal transducer 10 receives 8-bit data from the external RAM 15 through the port 20 and sequentially buffers eight sets of data. Next, the orthogonal transducer 10 collects eight sets of buffered data placed at the same bit position and transfers the collected data 22 to the SRAM 16 through the port 21.

Next, eight sets of data placed at the next bit position are collected and transferred to the SRAM 16 at the next address. The above-described operation is repeated so that the data input from the outside is subjected to orthogonal transformation and stored in the SRAM 16 as PE1 (5) data.

FIG. 6B shows an operation that is performed by the orthogonal transducer 10 when data for PE2 (7) is to be stored in the SRAM 16. FIG. 6B shows a case where 8-bit data stored in the external memory 15 are to be transferred for use in PE2 (7). Alternatively, however, 32-bit data may be received and transferred to the SRAM 16.

The data for use in PE2 (7) needs to be stored in 32 SRAMs 16. Hence, the orthogonal transducer 10 transfers the data to the SRAM 16 without performing a register operation for orthogonal transformation. The orthogonal transducer 10 receives 8-bit data from the external RAM 15 through the port 20 and transfers the received data 23 to the SRAM 16 through the port 21 without subjecting it to bit slicing.

In a manner described above, the orthogonal transducer 10 can store a mixture of PE1 (5) data and PE2 (7) data in the same SRAM.

FIGS. 7A to 7D are diagrams illustrating an example of a microcode program stored in the instruction RAM 11. Three different instructions are used: a controller instruction, a PE1 instruction, and a PE2 instruction. Combinations of these instructions are stored in the instruction RAM 11 as a VLIW instruction.

If the most significant bit of an instruction is "1" without regard to the setting of a MODE register, as shown in FIG. 7A, it means that the instruction is a controller instruction. If, on the other hand, the most significant bit of the instruction is "0", it means that the instruction is either a PE1 instruction or a PE2 instruction.

If, as shown in FIG. 7B, the setting of the MODE register is "0" and the most significant bit of the instruction is "0", it means that the instruction is a mixture of a controller instruction and a PE1 instruction. In FIG. 7B, a "load instruction", an "alu instruction", and a "mode instruction" are written as PE1 instructions. The mode instruction is an instruction for switching between 1 bit and 2 bits.

If, as shown in FIG. 7C, the setting of the MODE register is "1" and the most significant bit of the instruction is "0", it means that the instruction is a mixture of a controller instruction and a PE2 instruction.

As shown in FIG. 7D, the controller 12 first decodes the most significant bit of an instruction. If the most significant bit is "1", the controller 12 concludes that the instruction is a controller instruction. If, on the other hand, the most significant bit is "0", the controller 12 concludes that the instruction is a PE1 instruction or a PE2 instruction. The controller 12 then determines, in accordance with the setting of the MODE register, whether the instruction is a PE1 instruction or a PE2 instruction.

As the controller 12 can issue a controller instruction to change the MODE register setting, it can dynamically select a PE1 arithmetic unit and a PE2 arithmetic unit at the time of instruction execution. Further, when the instruction includes a "PE1 instruction" or a "PE2 instruction", the controller 12 can simultaneously execute multiple instructions including an instruction of an individual arithmetic unit and a subset of a controller instruction.

If the instruction includes a PE1 instruction, the controller 12 outputs a "load instruction" and an "alu instruction" to PE1 (5). As shown in FIG. 3, PE1 (5) reads 2-bit data from the SRAM 16 and loads the read data into a register in PE1 (5) in compliance with the "load instruction", performs an arithmetic operation on the data read from the SRAM 16 and the data in the register in compliance with the "alu instruction", and overwrites the two bits in the SRAM 16 with the result of arithmetic operation. As this operation can be completed in one cycle, data of arbitrary bit length can be computed by performing the above operation continuously.

If the instruction includes a PE2 instruction, the controller 12 outputs the PE2 instruction" to PE2 (7). PE2 (7), which is an arithmetic core that has an internal pipeline and can perform advanced computations, includes a register 18 that stores an intermediate computation result as shown in FIG. 4. In compliance with a PE2 instruction from the controller 12, PE2 (7) reads a required number of data from the SRAM 16 and performs an arithmetic operation in accordance with an internal sequencer. PE2 (7) then performs a delayed write to write a computation result again into the SRAM 16 through the register.

In general, several cycles are required for PE2 (7) to input data and output a computation result. However, a data load into an internal register and a data write from the internal register can be performed simultaneously. Therefore, performing a pipeline process enables the controller 12 to issue a computation request successively to PE2 (7). This makes it possible to apparently perform one arithmetic operation per cycle.

Further, the SRAM 16 includes four banks as described above. Therefore, even when an arithmetic operation is being performed by PE2 (7), that is, a maximum of three banks are being accessed, the remaining one bank can be used for data input/output. This enables PE1 (5) or PE2 (7) to perform an arithmetic operation while general-purpose CPU 13 or the DMAC 14 is transferring data between the external RAM 15 and the SRAM 16. Thus, overall system performance can be improved.

FIGS. 8A and 8B are diagrams illustrating addressing control that is exercised by using the aforementioned VLIW instruction. Addressing control will now be described briefly. However, addressing control will be described in detail later in connection with a second embodiment of the present invention.

FIG. 8A shows a controller instruction subset (vi instruction). In vi 0, "mvinc mp, r0, r1" means to substitute the value of register r0 into register mp, add the value of register r0 to the value of register r1, and substitute the result of addition into register r0. Further, in vi 0, "mvinc ap, r2, r3" means to substitute the value of register r2 into register ap, add the value of register r2 to the value of register r3, and substitute the result of addition into register r2.

FIG. 8B shows a VLIW instruction that includes a controller instruction subset and a PE2 instruction (FPU instruction). Add instruction "fadd ap2, ap, mp" means to add the value of register ap to the value of register mp and store the result of addition in register ap2. As the vi 0 instruction shown in FIG. 8A is written as a controller instruction, the value obtained by adding the values of registers r2 and r3 is substituted into register ap. Similarly, the value obtained by adding the values of registers r0 and r1 is substituted into register mp. Thus, the address (ap, mp) of the SRAM 16 from which data is to be read next can be controlled by register r3 or r1.

Multiply instruction "fmu1 ap2, ap, mp" means to multiply the value of register ap by the value of register mp and store the result of multiplication in register ap2. Product-sum instruction "fmac ap, mp" means to multiply the value of register ap by the value of register mp and sequentially add the result of multiplication to the value of an accumulator. These instructions can also be subjected to addressing control by the vi 0 instruction.

Figure 9:
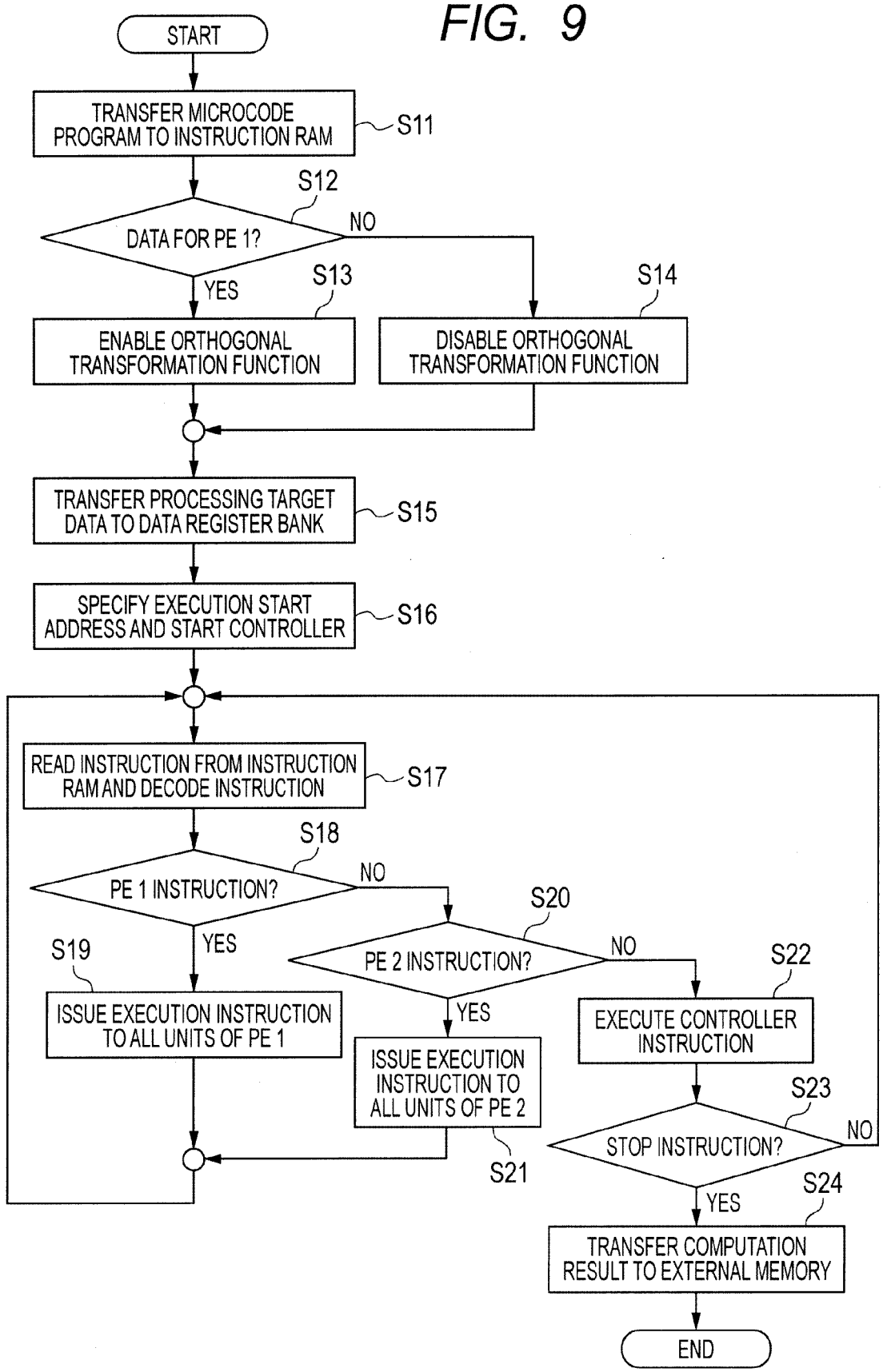
FIG. 9 is a flowchart illustrating processing steps performed by a system including the data processing device 100 shown in FIG. 1.

FIG. 9 is a flowchart illustrating processing steps performed by a system including the data processing device 100 shown in FIG. 1. First of all, the general-purpose CPU 13 reads a microcode program from the external RAM 15 and transfers the microcode program to the instruction RAM 11 in the data processing device 100 (step S11). Processing target data, which is stored in the external RAM 15 by the general-purpose CPU 13 or the DMAC 14, is then transferred to the orthogonal transducer 10.

Next, step S12 is performed to judge whether the transferred processing target data is PE1 data or PE2 data. If the processing target data is PE1 data (if the answer in step S12 is "YES"), the orthogonal transducer 10 subjects the processing target data to orthogonal transformation (step 13), and transfers the processing target data to a data register bank (SRAMs 2) (step S15). If, on the other hand, the processing target data is PE2 data (if the answer in step S12 is "NO"), the orthogonal transducer 10 directly transfers the processing target data to the data register bank (SRAMs 2) (step S15).

Next, the general-purpose CPU 13 specifies an execution start address and starts up the controller 12 (step S16).

The controller 12 starts reading an instruction from the instruction RAM 11 and decodes the read instruction (step S17). Next, the controller 12 judges whether the instruction is a PE1 instruction or PE2 instruction (step S18).

If the instruction is a PE1 instruction (if the answer in step S18 is "YES"), the controller 12 issues an execution instruction to all units of PE1 (5) (step S19), returns to step S17, and repeats the subsequent steps. If, on the other hand, the instruction is a PE2 instruction (if the answer in step S18 is "NO"), the controller 12 issues an execution instruction to all units of PE2 (7) (step S21), returns to step S17, and repeats the subsequent steps.

If the instruction is neither a PE1 instruction nor a PE2 instruction, that is, if the instruction is a controller instruction (if the answer in step S20 is "NO"), the controller 12 executes the controller instruction (step S22). If, in this instance, the controller instruction is a stop instruction for concluding an arithmetic operation (if the answer in step S23 is "YES"), the controller 12 transfers the result of computation to the external RAM 15 (step S24) and terminates the process. If, on the other hand, the controller instruction is not such a stop instruction (if the answer in step S23 is "NO"), the controller 12 returns to step S17 and repeats the subsequent steps.

Figure 10:
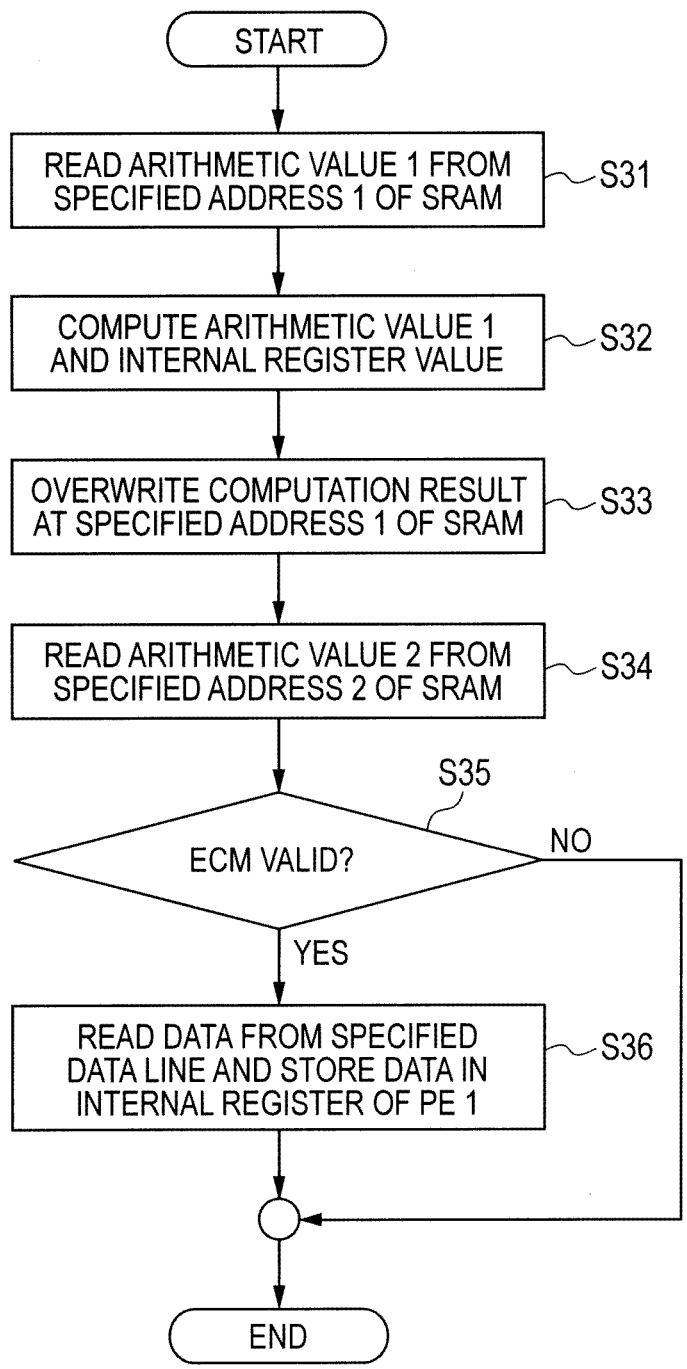
FIG. 10 is a flowchart illustrating processing steps that are performed when PE1 (5) executes a PE1 instruction.

FIG. 10 is a flowchart illustrating processing steps that are performed when PE1 (5) executes a PE1 instruction. First of all, PE1 (5) reads computation target data (arithmetic value 1) from specified address 1 of the SRAM 16 (step S31). PE1 (5) then computes arithmetic value 1 and an internal register value (step S32).

Next, PE1 (5) overwrites a computation result at specified address 1 of the SRAM 16 (step S33), and reads arithmetic value 2 from specified address 2 of the SRAM 16 (step S34). PE1 (5) then judges whether a data move operation performed by the ECM 4 is valid or not (step S35).

If the data move operation performed by the ECM 4 is valid (if the answer in step S35 is "YES"), PE1 (5) reads data from a specified data line (entry), stores the data in an internal register of PE1 (5) (step S36), and terminates the process. If, on the other hand, the data move operation performed by the ECM 4 is invalid (if the answer in step S35 is "NO"), PE1 (5) immediately terminates the process.

Figure 11:
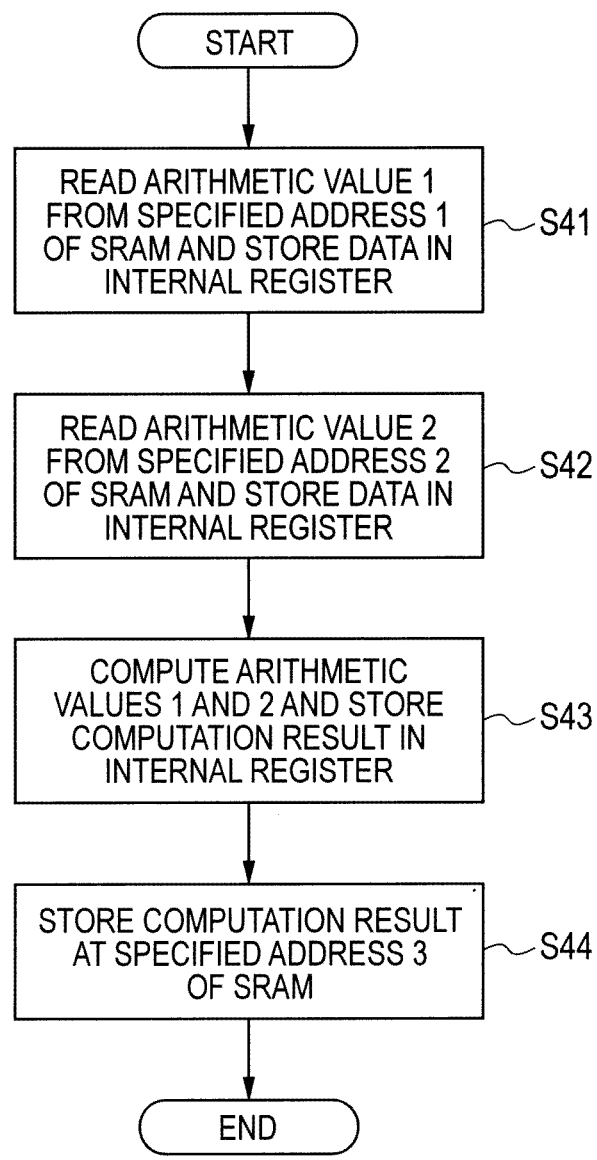
FIG. 11 is a flowchart illustrating processing steps that are performed when PE2 (7) executes a PE2 instruction.

FIG. 11 is a flowchart illustrating processing steps that are performed when PE2 (7) executes a PE2 instruction. First of all, PE2 (7) reads arithmetic value 1 from specified address 1 of the SRAM 16 and stores arithmetic value 1 in an internal register (step S41). Further, PE2 (7) reads arithmetic value 2 from specified address 2 of the SRAM 16 and stores arithmetic value 2 in the internal register (step S42).

Next, PE2 (7) computes arithmetic values 1 and 2 and stores the result of computation in the internal register (step S43). PE2 (7) then stores the computation result at specified address 3 of the SRAM 16 (step S44) and terminates the process.

As described above, the data processing device according to the present embodiment is configured so that the SRAMs 2 is provided for each unit of PE1 (5), and that PE2 (7) is provided for 32 units of SRAMs 2. Therefore, PE1 (5) and PE2 (7) can share the SRAMs 2.

Further, the orthogonal transducer 10 subjects PE1 data to orthogonal transformation and stores the resultant data in the SRAMs 2, but stores PE2 data directly in the SRAMs 2. Therefore, a mixture of PE1 data and PE2 data can be stored in the SRAMs 2.

Moreover, the controller 12 allows PE1 (5) and PE2 (7) to selectively perform arithmetic operations in accordance with the setting of the MODE register. Therefore, the arithmetic units can be allowed to selectively perform arithmetic operations they are good at. For example, PE1 (5) can be allowed to compute variable-length bit data while allowing PE2 (7) to compute fixed-length bit data.

Second Embodiment

In a second embodiment of the present invention, the data processing device described in connection with the first embodiment is applied to a perimeter monitoring system based on a millimeter-wave radar, which is a vehicle-mounted device. Therefore, components and functions identical with those of the first embodiment will not be redundantly described.

Figure 12:
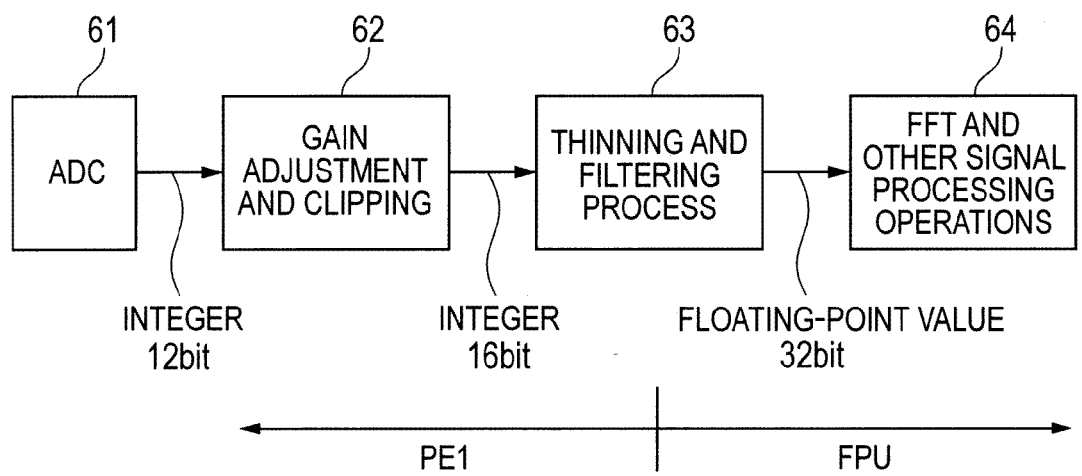
FIG. 12 is a diagram illustrating an example of a millimeter-wave radar signal process performed by a perimeter monitoring system according to a second embodiment of the present invention.

FIG. 12 is a diagram illustrating an example of a signal process of the millimeter-wave radar for the perimeter monitoring system according to the second embodiment of the present invention. Information acquired by the millimeter-wave radar (not shown) is converted to 12-bit digital data by an ADC (Analog-to-Digital Converter) 61 and stored in the external RAM 15. In the sequence described in connection with the first embodiment, the data processing device 100 inputs 12-bit data from the external RAM 15 and performs a gain process and a clipping process by means, for instance, of number-of-digits adjustment and code extension (62). The data is then thinned, converted to a floating-point value, subjected to low-pass filtering or other signal processing (63), and subjected to FFT (Fast Fourier Transform) for frequency analysis purposes (64).

Under normal conditions, a general-purpose CPU, for instance, performs an arithmetic operation by using a 16-bit or 32-bit fixed bit length register. However, when 12-bit data input from the ADC 61 of the millimeter-wave radar is to be processed, the area and power consumed for unused high-order bits are wasted. Such data can be processed with higher efficiency when a fine-grained arithmetic unit is used.

However, the fine-grained arithmetic unit cannot rapidly perform a floating-point arithmetic operation required for signal processing as described above. As such being the case, in the perimeter monitoring system according to the present embodiment, PE1 (5), which is a fine-grained arithmetic core, makes gain adjustments and performs a clipping process (62) and a thinning process (63), and after the result of such computation is converted to a floating-point value, an FPU, which is a coarse-grained arithmetic core, performs a filtering process (63) and makes an FFT-based frequency analysis (64), as shown in FIG. 12.

Figure 13:
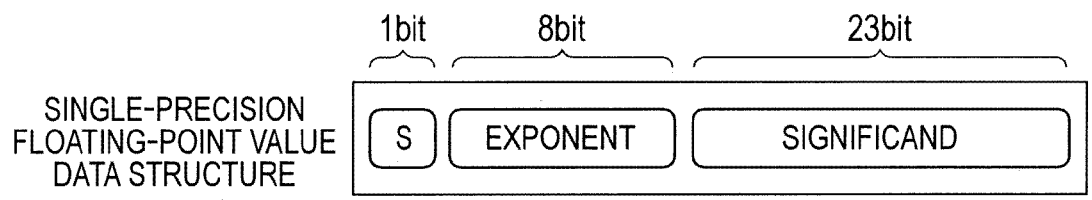
FIG. 13 is a diagram illustrating the data structure of a floating-point value processed by an FPU according to the second embodiment of the present invention.

FIG. 13 is a diagram illustrating the data structure of a floating-point value processed by the FPU according to the second embodiment of the present invention. The floating-point value has a single-precision floating-point value data structure defined by IEEE 754, and includes a most significant sign bit (1 bit), an 8-bit exponent, and a 23-bit significand.

Figure 14:
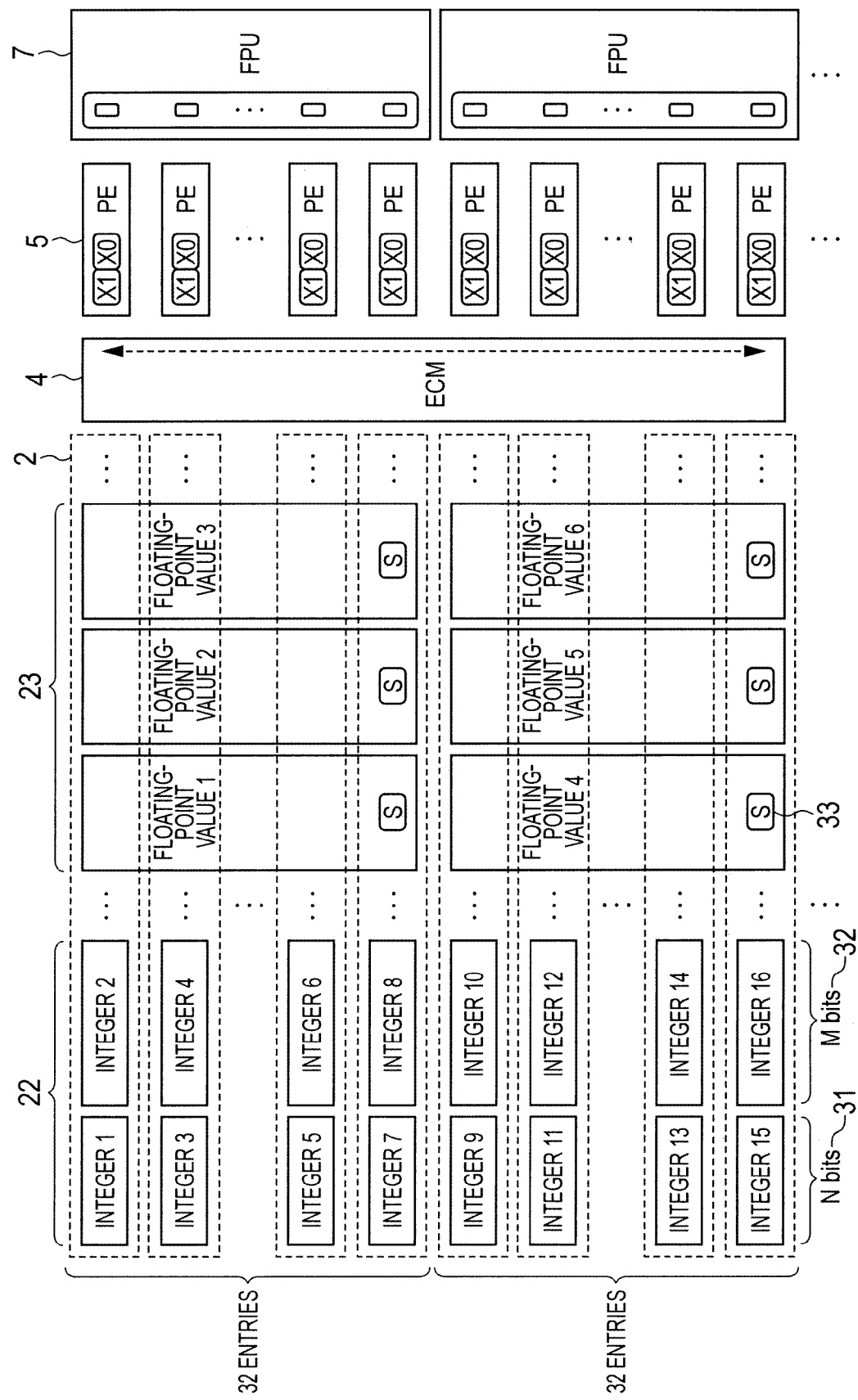
FIG. 14 is a diagram illustrating the data placement scheme of a data processing device for the perimeter monitoring system according to the second embodiment of the present invention.

FIG. 14 is a diagram illustrating the data placement scheme of the data processing device for the perimeter monitoring system according to the second embodiment of the present invention. The data processing device shown in FIG. 14 differs from the data processing device 100 according to the first embodiment, which is shown in FIG. 1, only in that PE2 (7) is replaced by an FPU 7. Therefore, components and functions identical with those of the first embodiment will not be redundantly described.

Figure 15:
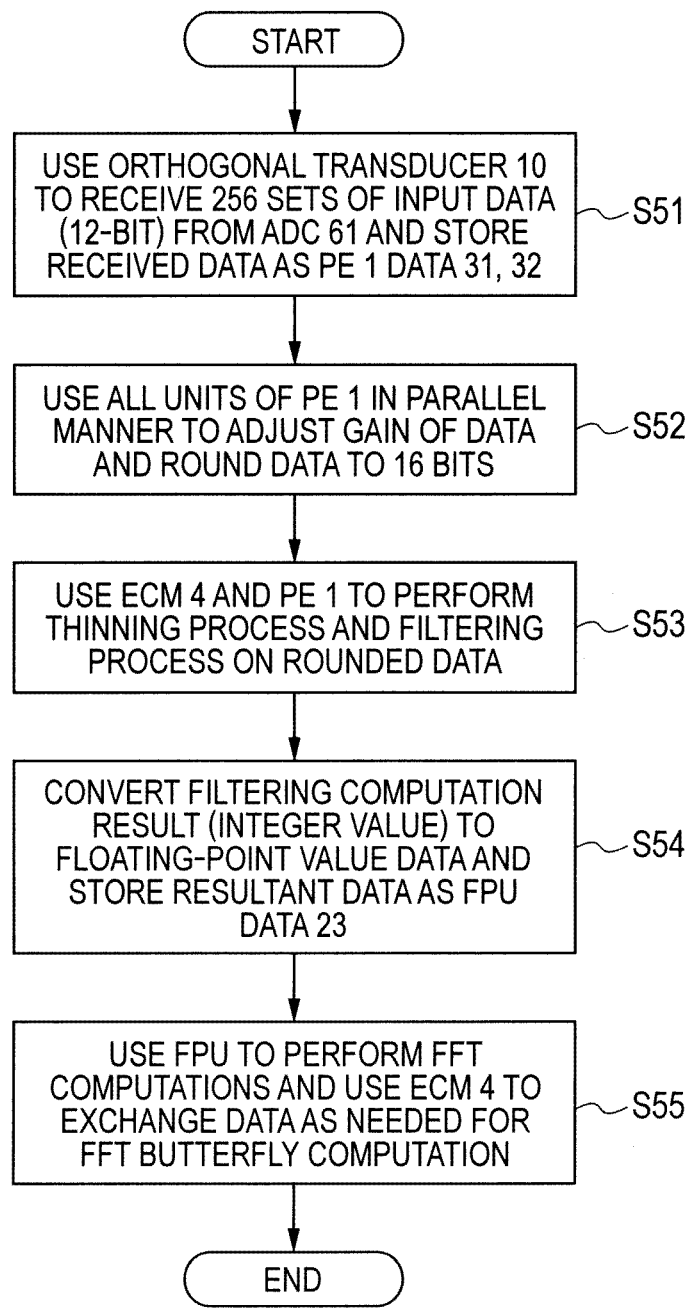
FIG. 15 is a flowchart illustrating processing steps performed by the perimeter monitoring system according to the second embodiment of the present invention.

FIG. 15 is a flowchart illustrating processing steps performed by the perimeter monitoring system according to the second embodiment of the present invention. Signal processing steps performed by the millimeter-wave radar for the perimeter monitoring system according to the second embodiment will now be described with reference to FIGS.

14 and 15. The signal processing steps are performed when the controller 12 executes a microcode program stored in the instruction RAM 11.

First of all, 12-bit data from the ADC 61, which is stored in the external RAM 15, is sequentially input into the orthogonal transducer 10. The orthogonal transducer 10 subjects 256 sets of 12-bit data to orthogonal transformation and stores the resultant data in the form of data 31, 32 (integer values 1 to 16) shown in FIG. 14 (step S51). Although only integer values 1 to 16 are indicated in FIG. 14, it is assumed that 256 integer values are stored in 256 units of SRAMs 2.

Next, the controller 12 makes gain adjustments and performs a clipping process by causing PE1 (5) to compute integer values 1 to 256, and then rounds the obtained data to 16-bit data (step S52). This processing step is executed in a parallel manner by all units of PE1 (5).

Next, the controller 12 controls the ECM 4 and PE1 (5) to perform a thinning process and filtering process on the rounded data (step S53). The controller 12 then converts the result of filtering computation to floating-point value data and stores floating-point values 1 to 6 in the SRAMs 2 as FPU data 23 (step S54). The above integer value-to-floating point value conversion can be effected by allowing PE1 (5) to decode and encode 256 sets of data in a parallel manner. However, such conversion can also be effected by using a function of the FPU 7.

Next, the controller 12 causes the FPU 7 to perform FFT computations by using a floating-point value (step S55). Data exchange necessary for FFT butterfly computation can be made by using the ECM 4 as described later.

PE1 (5), which is a fine-grained arithmetic core, can compute 256 sets of data in a parallel manner. However, when an FPU data structure is employed, the degree of computation parallelism is 8. Therefore, it is necessary to select either PE1 (5) or the FPU 7 to perform computations in accordance with the data type and process description. However, the controller 12 interprets a microcode program as described earlier to dynamically make such a selection.

FIGS. 16A to 16C are diagrams illustrating an example of a floating-point arithmetic operation performed by the FPU 7. FIGS. 16A to 16C show a case where An=Fn+Dn and En=Bn+Hn are computed after Cn=Bn+Dn and Gn=Fn+Hn are computed.

First of all, data Bn, Dn, Fn, and Hn, which are required for computation, are transferred to banks 2 and 4 and disposed as shown in FIG. 16A. Data Bn are disposed for entries 0 to 31 of bank 2, and data Fn are disposed for entries 32 to 63 of bank 2. Further, data Dn are disposed for entries 0 to 31 of bank 4, and data Hn are disposed for entries 32 to 63 of bank 4. It should be noted that entries 0 to 31 are coupled to FPU 1 whereas entries 32 to 63 are coupled to FPU 2.

At first, FPUs 1 and 2 simultaneously compute Cn=Bn+Dn and Gn=Fn+Hn. As FPUs 1 and 2 are SIMD coupled, they respectively compute different data that are placed at the same entry position. When, for instance, a general-purpose CPU is used, it is necessary to compute Cn and Gn separately. In the present embodiment, however, Cn and Gn can be simultaneously computed because FPUs 1 and 2 are formed by an SIMD parallel processor.

Next, as shown in FIG. 16B, PE1 (5) and the ECM 4 exercise an inter-entry communication function to exchange data Bn and Fn. As described earlier, the ECM 4 is coupled to entries positioned at a distance raised to the power of two, and capable of moving a value of up to 2 bits to another entry on every cycle for exchange purposes.

As the aforementioned data move and exchange are performed by using PE1 (5), the floating-point value stored for an FPU is separated on a bit-by-bit basis, and PE1 (5) corresponding to each entry exchanges entry values that are placed 32 entries vertically apart from each other. In this instance, PE1 (5) can perform its process in units of up to 2 bits. Therefore, two consecutively disposed floating-point values can be simultaneously moved for exchange purposes.

Finally, as shown in FIG. 16C, FPUs 1 and 2 simultaneously compute An=Fn+Dn and En=Bn+Hn.

The amount of computation is now considered in a situation where, for example, 10 sets of data belong to Bn, Dn, Fn, and Hn, respectively. If a general-purpose CPU is used in this situation, all arithmetic operations need to be sequentially performed. More specifically, the determinations of Cn, Gn, An, and En each require 10 arithmetic operations. It means that a total of 40 arithmetic operations need to be performed. Further, if data exchange is to be made, a data copy needs to be made three times in a situation where, for example, a temporary register tmp=Bn, Bn=Fn, and tmp=Fn. Therefore, the number of data arithmetic operations and move processing operations for Cn and Gn or An and En is 10+30+10=50, respectively.

In the present embodiment, on the other hand, the number of arithmetic operations is 10, respectively, because FPUs 1 and 2 can simultaneously compute Cn and Gn or An and En. Further, PE1 (5) and the ECM 4 can simultaneously exchange two floating-point values. Thus, an arithmetic processing operation in step 1, which is shown in FIG. 16A, is performed 10 times; a data move processing operation in step 2, which is shown in FIG. 16B, is performed 5 times; and an arithmetic processing operation in step 3, which is shown in FIG. 16C, is performed 10 times. It means that a total number of processing operations is 25.

As described above, the present embodiment makes it possible to decrease the number of data arithmetic operations and data move processing operations. Further, PE1 (5) can process each bit of FPU data on an individual basis. Therefore, when, for instance, the absolute value of a floating-point value is to be computed, only PE1 (5) corresponding to a sign bit 33 of data stored for an FPU as shown in FIG. 14 is operated to compute the absolute value without operating the FPU. This makes it possible to reduce the amount of power consumption. In a processing operation for the above absolute value computation, it is assumed that if the sign bit is "1", it is changed to "0", and that if the sign bit is "0", it is used as is.

FIGS. 17A to 17C are diagrams illustrating addressing mode examples of the data processing device according to the second embodiment of the present invention. Various addressing modes are required for signal processing. Concrete addressing mode examples are shown in FIGS. 17A to 17C.

FIG. 17A shows a case where correlated elements in an array are computed and the results of computations are stored in the correlated elements in another array. When FPU 1 computes An=Bn×Cn and stores the computation result An, all the addresses from which data are to be read and all the addresses at which data are to be written are sequentially incremented.

FIG. 17B shows a case where all elements Bn in an array are multiplied by fixed coefficient C0 and the result of the computations are stored in the correlated elements in another array. The address from which element Bn is to be read and the address at which element An is to be written are sequentially incremented, and the address from which element C0 is to be read is fixed.

FIG. 17C shows a case where the results of multiplications of arrays Bn and Cn are sequentially added (accumulated) and stored in an accumulator and the resultant sum is eventually stored in A0. The addresses from which elements Bn and Cn are read are sequentially incremented, and the address at which element A0 is to be written is fixed. As this process can accumulate the results of multiplications of correlated elements in arrays, it is effective, for instance, for convolution processing, which is frequently used for signal processing purposes.

The above-described addressing modes can be implemented by a VLIW instruction executed by the controller 12. As shown in FIGS. 8A and 8B, the controller 12 specifies the type of computation and the position of data to be computed by PE1 (5) and FPU 7. The controller 12 stores the data position in internal registers (mp, ap, mp2, ap2), and can access the data through the use of arbitrary stride width by changing the values of these registers in the same cycle as for a computation instruction of the FPU 7.

The controller 12 executes the vi instruction shown, for instance, in FIG. 8A as a common instruction. The vi instruction is a set of eight instructions that define a frequently-used register arithmetic expression of the controller 12. One control instruction and two operating instructions can be simultaneously specified. The controller instruction subset is used to specify which vi instructions are to be read. The remaining bits are used to write the computation instructions of PE1 (5) and FPU 7.

As shown in FIG. 8B, a controller instruction subset and an FPU instruction, which are written in one line, are simultaneously executed. For example, an add instruction is executed, while at the same time, a vi instruction specified by the controller instruction subset is interpreted to update a register value.

As regards "mvinc mp, r0, r1", not only a consecutive addressing mode shown in FIGS. 17A to 17C but also an addressing mode with a fixed stride width can be implemented by specifying the array start position for register r0 and specifying the stride width for register r1. Although butterfly computations are performed in FFT, which is used for millimeter-wave radar processing, the use of this VLIW instruction makes it possible to perform butterfly computations with high efficiency.

FIG. 18 is a diagram illustrating another example of the system according to the second embodiment of the present invention. The data processing device shown in FIG. 18 differs from the data processing device 100 according to the first embodiment, which is shown in FIG. 1, only in that PE2 (7) is replaced by a 32-bit integer product-sum operation (MAC) 7. Therefore, components and functions identical with those of the first embodiment will not be redundantly described.

Arbitrary bit positions of MAC computation data (integer values 17 to 22) shown in FIG. 18 can be masked by PE1 (5). Further, two high-order bits of integer value 17 can be bit-shifted to low-order bit positions of integer value 20 by the ECM 4.

Common SIMD parallel arithmetic units do not adequately function to exchange data appropriate for individual arithmetic units. Therefore, data exchange and bit shifting need to be performed, for instance, by a general-purpose CPU. In the present embodiment, however, MAC data can be regarded as 256-bit cyclical data. Therefore, PE1 (5) can compute these arbitrary bits on an individual basis.

As described above, when a microcode program is prepared in such a manner that arithmetic cores to be used are selected in accordance with input data, the perimeter monitoring system according to the present embodiment can efficiently perform an arithmetic process, thereby improving the performance-to-power ratio.

Further, SIMD-coupled FPUs 7 are operated in a parallel manner to perform floating-point arithmetic operations. Therefore, an arithmetic process can be performed at a higher speed than a CPU or DSP, which can perform only one arithmetic operation.

Furthermore, PE1 (5) and the ECM 4 are used to move and exchange data between FPUs. Therefore, data can be moved and exchanged with a smaller number of operations.

Moreover, even when data are not arranged consecutively, the controller 12 performs register computations with a VLIW instruction. This makes it possible to support a flexible addressing mode.

The above-described embodiments are to be considered in all respects only as illustrative and not restrictive. The scope of the present invention is, therefore, indicated by the appended claims rather than by the foregoing description. All changes which come within the meaning and range of equivalency of the claims are to be embraced within their scope.

What is claimed is:

1. A data processing device comprising:
a first computation array, comprising a plurality of first processors of SIMD arithmetic type;
a second computation array, comprising a plurality of second processors;
a memory array, comprising a plurality of memories, coupled to both of the first and second computation arrays; and
an orthogonal transducer, configured to receive data for either of the first or second computation arrays, and store data in the memory array;
wherein the first processors each perform an arithmetic operation on data stored in one of the memories in the memory array;
wherein the second processors each perform an arithmetic operation on data stored in a plurality of the memories in the memory array, and
wherein the orthogonal transducer is configured to:
for data received for the first processors, orthogonally transform the received data and store the orthogonally transformed data in the memory array; and
for data received for the second processors, store the received data in the memory array without orthogonal transformation.

2. The data processing device according to claim 1,
wherein the first processors perform an arithmetic operation on variable-bit length data, and
wherein the second processors perform an arithmetic operation on fixed-bit length data.

3. The data processing device according to claim 1, wherein the orthogonal transducer orthogonally transforms the results of computations performed by the first processors, which are stored in the memories, and outputs the transformed computation results to the outside, and outputs the results of computations performed by the second processors, which are stored in the memories, directly to the outside.

4. The data processing device according to claim 1, further comprising:
a data mover that is disposed between the memories and the first and second processors to move and supply data stored in the memories to a first processor other than the corresponding first processors.

5. The data processing device according to claim 1, further comprising an instruction memory that stores a microcode program; and
    a controller that interprets the microcode program stored in the instruction memory and selectively causes the first processors and the second processors to perform an arithmetic process.

6. The data processing device according to claim 1, wherein the second processors each include a floating-point arithmetic unit and perform an arithmetic process upon receipt of data from some number of the memories, the number of which corresponds to the data length of the floating-point arithmetic unit.

7. The data processing device according to claim 1, wherein the second processors each include a product-sum arithmetic unit and perform an arithmetic process upon receipt of data from some number of the memories, the number of which corresponds to the data length of the product-sum arithmetic unit.

* * * * *